(No Model.)

P. VON LACKUM.
TAIL GUARD FOR HORSES.

No. 553,810. Patented Jan. 28, 1896.

Witnesses

Peter Von Lackum.
Inventor

By N. K. Evans & Co.
Atty's.

UNITED STATES PATENT OFFICE.

PETER VON LACKUM, OF OMAHA, NEBRASKA.

TAIL-GUARD FOR HORSES.

SPECIFICATION forming part of Letters Patent No. 553,810, dated January 28, 1896.

Application filed July 6, 1895. Serial No. 555,139. (No model.)

*To all whom it may concern:*

Be it known that I, PETER VON LACKUM, a citizen of the United States, residing at Omaha, Douglas county, Nebraska, have invented certain new and useful Improvements in Tail-Guards for Horses, of which the following specification contains a full, clear, and exact description, reference being had to the accompanying drawings, in which—

Figure 1:
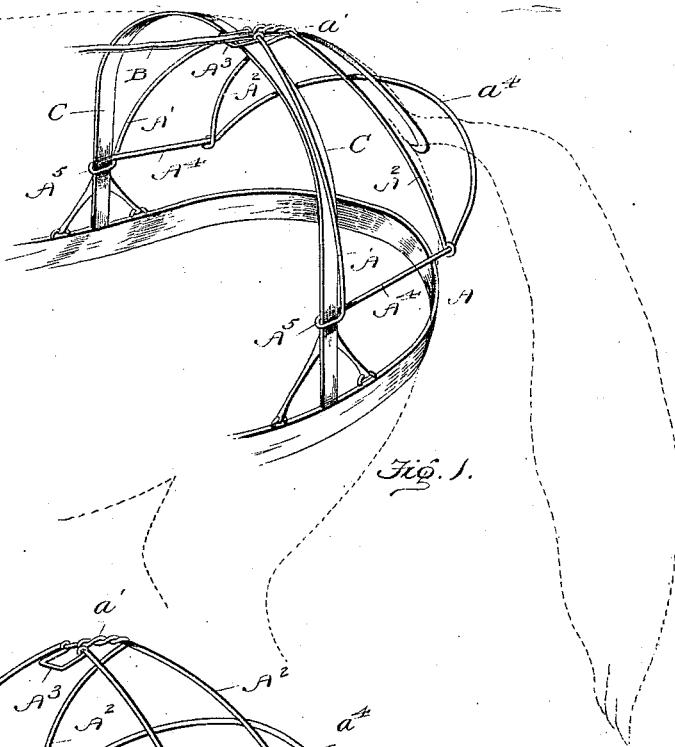
Figure 2:
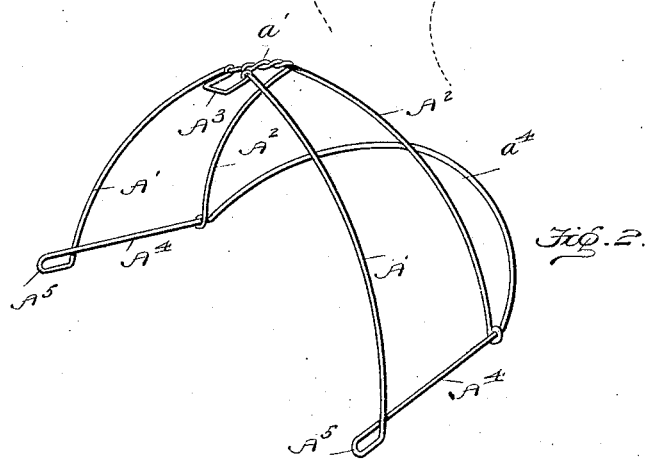
Figure 3:
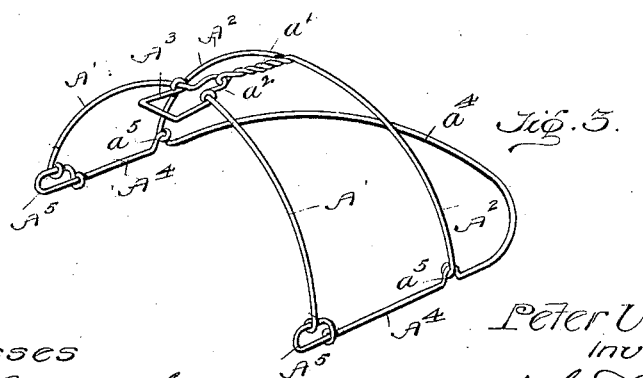

Figure 1 is a perspective showing one form of my improved tail-guard applied. Fig. 2 is a perspective of the tail-guard removed. Fig. 3 is a perspective of another construction.

The object of the invention is to provide a simple guard, which is capable of being readily applied to the harness and will prevent the horse from switching his tail over the driving lines or reins and getting them thereunder.

The invention consists in the construction and arrangement of parts hereinafter described and claimed.

A is the guard preferably constructed of one or more lengths of wire or other material, round or flat, in the form of an open frame of a size to embrace the animal's rump. This frame comprises a pair of side arms $A'$ $A^2$ at each side connected at their upper ends and provided with a pivoted loop or fastener $A^3$ to engage the back-strap B of the harness. The lower ends of the arms $A'$ $A^2$ are connected by the sides of a horizontal ⋂-shaped member $A^4$, the rear curved end $a^4$ of which is inclined upwardly and forms the guard proper, since it is arranged to cross the upper portion of the animal's tail and prevent it from being switched over the driving lines or reins, as will be apparent from Fig. 1.

The lower forward corners of the guard A are provided with loops $A^5$ for the breeching-carrying straps C C of the harness. By means of the loops $A^3$ $A^5$ $A^5$ the guard A will be carried by the harness to be applied and removed therewith from the animal.

The guard A in Figs. 1 and 2 is formed as follows: I take a piece of wire and bend it into ⋂ shape to form the member $A^4$; then the wire is bent at the front ends of the member $A^4$ to form the loops $A^5$ $A^5$, after which the two ends of the wire are carried upward to form the curved side arms $A'$, at the upper ends of which the wires are twisted together at $a'$ and carried rearwardly and thence downwardly and rearwardly to form the rear side members $A^2$ $A^2$, the lower ends of which are bent around the side arms of the ⋂-shaped member $A^4$ just where it begins to incline upwardly. The pivoted loop $A^3$ has eyes on its ends which swing on the upper ends of the forward side arms $A'$, as clearly shown in the drawings. The ⋂-shaped member by its upward inclination allows the animal to switch his tail within certain limits but prevents it from being raised high enough to pass over the driving lines or reins.

The guard shown in Fig. 3 consists in the lower ⋂-shaped member $A^4$ formed at its front ends with loops $A^5$ and between its ends with upwardly-extending bends $a^5$, while the forward side arms $A'$ $A'$ are formed of a single curved wire secured at its ends to the upper sides of the loops $A^5$ and formed at its middle with a bend or eye $a^2$. The rear side arms $A^2$ are formed of a piece of wire twisted at its middle, as shown at $a'$, with the forward end of said twisted portion connected to the bend or eye $a^2$ and its ends connected to the bends $a^5$. In this form of my guard the lower member $A^4$ extends rearwardly and upwardly when in position on the animal, so that its rear curved portion crosses the upper portion of the animal's tail. The loop $A^3$ is connected just as in Figs. 1 and 2.

Having thus described my invention, what I claim is—

1. A tail-guard for horses, comprising an open frame formed of the front curved arms $A'$ $A'$, the rear curved arms, $A^2$ $A^2$, a twisted connection, $a'$ between the upper ends of said arms $A'$ $A^2$, the lower member $A^4$, connecting the lower ends of the arms $A'$ $A^2$ and having a curved rear portion $a^4$, integral loops $A^5$ at the front lower corners of the frame and the loop $A^3$ hinged to the adjacent upper ends of the front arms $A'$, substantially as described.

2. A tail-guard for horses consisting in the lower curved member $A^4$ formed at its ends with loops $A^5$ and having bends $a^5$ and a rear curved portion $a^4$, the front curved side arms $A'$ $A'$ formed of an arched piece secured at its ends to the loops $A^5$ and having a pivoted loop $A^3$ and a bend $a^2$ at its middle, and the rear curved side arms $A^2$ connected at their lower ends to the bends $a^5$ and formed at their adjacent ends with a twisted portion $a'$, engaging the bend $a^2$, substantially as described.

PETER VON LACKUM.

Witnesses:
RASUMEO NIELSEN,
JNO. E. DAVIS.